United States Patent Office 2,916,481
Patented Dec. 8, 1959

2,916,481

CROSSLINKING OF POLYETHYLENE WITH NOVEL PEROXIDES

Ernest R. Gilmont, Princeton, N.J., assignor to Food Machinery and Chemical Corporation, New York, N.Y., a corporation of Delaware No Drawing. Application May 4, 1959
Serial No. 810,529

16 Claims. (Cl. 260—94.9)

This invention relates to a process of crosslinking polyethylene, and to polyethylene-containing compositions which are reactive to form crosslinked, thermoset products.

The polyethylenes of commerce comprise those having densities in the low to medium range, on the order of 0.92 to 0.95, and those having medium to high densities, on the order of 0.95 to 0.98. The low density materials have found widespread commercial application in uses where their low softening temperatures, below the normal boiling point of water, have not been a serious disadvantage. The more recently available higher density polyethylenes, which soften at temperatures above the boiling point of water, have overcome some of the disadvantages of the lower softening materials. However, for certain applications such as wire coating, and the like, even the higher softening temperatures of the high density materials have not been satisfactory.

Considerable efforts have been made with both types of polyethylene to provide finished products having greater resistances to cold flow and high temperature softening. One approach has been to irradiate polyethylene products to cause crosslinking of the polyethylene molecules. Another approach has been to attempt crosslinking, or curing, of the polyethylene with agents such as peroxides, nitrogen compounds, and other chemicals capable of liberating free radicals which promote crosslinking.

Among these chemicals, a relatively few organic peroxides have been found to crosslink polyethylene. However, in all cases they suffer disadvantages. Benzoyl peroxide, for example, dissociates into free radicals during its incorporation into even low density polyethylenes which soften at low temperatures. This causes loss of peroxide as well as partial precure, or scorch, of the polyethylene. Crosslinking agents are too scorchy if they are so active at normal processing temperatures that the polyethylene is liable to cure prematurely or scorch and accordingly cause economic losses and constitute a safety hazard during processing.

In many applications dicumylperoxide can be incorporated into low density polyethylenes without scorching. However, when it is attempted to incorporate it into the higher density polyethylenes, it tends to react prematurely with the polyethylenes at the elevated temperatures required for such incorporation, with consequent scorching of the polyethylene and loss of peroxide. Other peroxides, such as t-butyl pentamethylethyl peroxide, can be incorporated into all polyethylenes without scorching. However, they do not effect crosslinking of the polyethylenes under normally useful conditions. Various of the peroxides likewise suffer further disadvantages, for example, they provide cured polyethylene products which impart extreme taste to water, and therefore they cannot be used in many applications.

It is a feature of this invention to provide organic peroxides which can be incorporated readily and without scorching into polyethylenes of various densities.

It is a further feature of this invention to provide such peroxides which are reactive with both high density and low density polyethylenes, under practical and useful conditions, to yield uniform crosslinked products having excellent physical and chemical properties including flexibility, resistance to environmental stress cracking, and ozone and impact resistance.

In accordance with this invention, polyethylene is compounded with a peroxide from the class of bis(tert-alkylperoxy)-alkanes of the following formula:

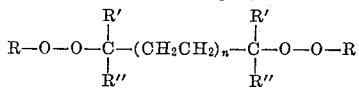

where $n$ is 1 or 2, R is a tertiary alkyl radical, R' and R'' are either individual hydrocarbon radicals, or are alkylene radicals connected to form a cycloalkylene radical. The hydrocarbon radicals, R' and R'', suitably are alkyl, cycloalkyl, aralkyl, or aryl hydrocarbon radicals. Preferred peroxides are those in which R is a tertiary alkyl radical having from 4 to 8 carbon atoms, and in which R' and R'' are primary alkyl radicals, particularly such radicals having from 1 to 8 carbon atoms.

The peroxide-polyethylene compositions of this invention are resistant to scorching, irrespective of the density and melting temperature of the polyethylene employed. It is therefore surprising that they are readily convertible to crosslinked condition by exposure to temperatures only slightly above compounding temperatures.

Typical peroxides useful in forming the present polyethylene-peroxide compositions are: 2,5-bis(tert-amylperoxy)-2,5-dimethylhexane, 2,5-bis(tert-butylperoxy)-2,5-dimethylhexane, 1,1'-ethylenebis[1 - (tert - amylperoxy)cyclohexane], 2,5-bis(tertbutylperoxy)-2,5-diphenylhexane, 3,6-bis(tert-butylperoxy)-3,6-dimethyloctane, 2,7-bis(tert-butylperoxy)-2,7 - dimethyloctane, 2,5 - bis(tert-butylperoxy)-2,5-dicyclohexylhexane, 2,5 - bis(tert-butylperoxy)-2,5-dibenzylhexane, 8,11-bis(tert-butylperoxy)-8,11-dimethyloctadecane, and 2,5-bis(2,5-dimethyl-2-hexylperoxy)-2,5-dimethylhexane.

These peroxides, and methods for their preparation, are described in co-pending patent application Serial No. 786,711, filed January 14, 1959, in the name of the present inventor.

Several factors determine the amount of peroxide to be compounded with the polyethylene. These include the extent of crosslinking desired, the activity of the particular peroxide, and conditions to be employed in the crosslinking operation. Normally the amount of peroxide employed will be about 0.1 to 10 parts by weight for each 100 parts by weight of polyethylene. Preferably, about 0.5 to 3 parts of peroxide will be used.

The polyethylene-peroxide compositions may include other additives, such as those normally employed in plastics compositions. Useful additives include fillers, other polymers, coloring agents, and where desired, other crosslinking agents. Where desired, particularly when liquid peroxides are employed, the peroxide may be adsorbed on such fillers as silica, carbon black, calcium carbonate and the like, and introduced into the polyethylene compound in this fashion.

The present compositions suitably are prepared by mechanically blending the peroxide into the polyethylene at a stock temperature at which the polyethylene is sufficiently soft to be worked. In the case of the low density polyethylenes this temperature is about 240° to 260° F., while in the case of the high density polyethylenes it is about 275° to 315° F. It will be apparent that the polyethylenes having intermediate densities will be compounded at intermediate temperatures. Suitable equipment for the blending of the compositions includes two-roll mills, Banbury mixers, and the like.

Crosslinking of the compositions of this invention frequently will be carried out simultaneously with their formation into shaped products, such as molded, extruded or calendered articles, for example, wire, cable, pipe and sponge. The shaping and crosslinking may be effected at a temperature of about 320° to 450° F. Curing time will vary between a few seconds at high temperatures for thin sections, to an hour or more at lower temperatures, and for thick workpieces.

The curing and shaping operations need not be conducted simultaneously, however. It has been found advantageous in some applications to preshape the compositions, and to crosslink them in a separate operation. One very useful forming and crosslinking process is that used in providing polyethylene insulation on wires and cables. In this process the compounded polyethylene is extruded onto a cable or wire and immediately thereafter is cured by exposure to live steam at 350° to 450° F. for approximately one to four minutes. Other common methods of shaping and curing plastics and rubber compositions may be employed with the present polyethylene peroxide compositions.

The following examples are given by way of illustration only, and are not to be deemed limitative in any way. Percent compression values reported in the examples were determined in a Williams Plastometer, at 250° F. for the 0.92 density polyethylene samples, and at 300° F. for the 0.96 density polyethylene samples. Four 1" x .075" specimens were plied to provide a test sample, which was inserted in the Plastometer, and the Plastometer containing the specimen was placed in an oven for 30 minutes at the indicated temperature. Percent compressions were determined immediately on removal of the specimens from the oven.

Mooney values were determined in a Mooney Shear Disc Viscometer of the type described in ASTM Test Method D927-55T, employing the small rotor described therein. The low density polyethylene specimens were tested at 270° F., and the high density specimens were tested at 300° F. The Mooney values reported represented the total time elapsed between the start of the test and the observance of a reading five points above the lowest value.

*Example 1*

(a) One hundred grams of a polyethylene having a density of 0.92 and a number average molecular weight of 14,000, was blended at a stock temperature of 250° F. on a two-roll rubber mill with 1.75 g. of 2,5-bis(tert-butylperoxy)-2,5-dimethylhexane. The peroxide was added to the polyethylene on the mill; following addition of all of the peroxide the blend was milled for 3 minutes, with cutting.

The uncured batch was removed from the mill and cooled to room temperature. Portions of the batch were molded and cured at 340° F. for 20 minutes to provide 5" x 6" x .075" cured slabs. These slabs were cut into dumbbell test specimens and 1-inch square test samples.

A further portion of the uncured batch was provided for testing in the Mooney Shearing Disc Viscometer. Test specimens containing no peroxide were prepared for comparison purposes in the same fashion as the cured and uncured test specimens. The products were tested with the following results:

|  | Percent Compression | 10% Modulus, p.s.i. | 100% Modulus, p.s.i. | Tensile p.s.i. | Percent Elongation At Break | Shore D Hardness | Mooney Value, Minutes |
|---|---|---|---|---|---|---|---|
| Percent peroxide: |  |  |  |  |  |  |  |
| 0 | 75 | 1,190 | 1,300 | 1,500 | 600 | 46 | -------- |
| 1.75 | 0.8 | 740 | 1,280 | 2,700 | 555 | 43 | 33 |

(b) A polyethylene-peroxide blend using 1.75 g. of dicumyl peroxide in place of the peroxide of Example 1(a), was prepared by the procedure recited in that example. The Mooney value of this blend was 14 minutes, indicating that it had a considerably greater tendency to scorch than did the corresponding blend of polyethylene with the peroxide used in Example 1(a).

*Example 2*

The procedure of Example 1(a) was followed, using 1.75 g. of 2,5-bis(tert-amylperoxy)-2,5-dimethylhexane in place of the peroxide used in that example. The products of this example were tested with the following results:

|  | Percent Compression | 10% Modulus, p.s.i. | 100% Modulus, p.s.i. | Tensile p.s.i. | Percent Elongation At Break | Shore D Hardness | Mooney Value, Minutes |
|---|---|---|---|---|---|---|---|
| Percent Peroxide: |  |  |  |  |  |  |  |
| 0 | 75 | 1,190 | 1,300 | 1,500 | 600 | 46 | -------- |
| 1.75 | 18 | 900 | 1,300 | 2,000 | 480 | 44 | 25 |

*Example 3*

(a) The procedure of Example 1(a) was followed with the exceptions noted. In this example 50 g. of Thermax, a soft semi-reinforcing medium thermal carbon having a specific gravity of 1.80 and obtained by the thermal decomposition and natural gas, was milled into the polyethylene before the peroxide was added to it. The specimens containing no peroxide also were compounded with 50 parts of Thermax. In this example the molding and curing operation was conducted at 320° F. for 40 minutes, rather than at 340° F. for 20 minutes. The products of this example were tested with the following results:

|  | Percent Compression | 10% Modulus, p.s.i. | 100% Modulus, p.s.i. | Tensile p.s.i. | Percent Elongation At Break | Shore D Hardness | Mooney Value, Minutes |
|---|---|---|---|---|---|---|---|
| Percent Peroxide: |  |  |  |  |  |  |  |
| 0 | 75 | 1,600 | -------- | 1,730 | 50 | 55 | -------- |
| 1.75 | 0.2 | 1,390 | 1,710 | 2,620 | 340 | 54 | 45 |

(b) The procedure of Example 3(a) above was followed, excepting that the peroxide was deposited on an equal weight of Hi-Sil 233, and added to the polyethylene in this form. The Hi-Sil 233 is a white, hydrated silica pigment having an average particle size of 0.022 microns, a specific gravity of 1.95, and a bulk density of 10 lb./ft.³. The cured products produced in this fashion had physical properties which very closely approximated those of the cured products of Example 3(a).

(c) A sample comparative to the material of Example 3(a) above, in which the peroxide used there was replaced with 1.75 g. of dicumyl peroxide, had a Mooney value of 16 minutes. This indicated that the dicumyl peroxide-polyethylene blend had a considerably greater tendency to scorch, or precure, than did the corresponding polyethylene blend containing the peroxide of Example 3(a).

(b) The procedure of Example 5(a) was repeated with the exception that the peroxide used there was replaced with 2 g. of dicumyl peroxide. A valid Mooney value could not be obtained for the reason that the sample scorched while it was being blended on the mill.

*Example 6*

The procedure of Example 5(a) was followed, with the exception that the peroxide employed in that example was replaced with 2 g. of 2,5-bis(tert-amylperoxy)-2,5-dimethylhexane. The products of this example were tested with the following results:

|                   | Percent Compression | 10% Modulus, p.s.i. | 100% Modulus, p.s.i. | Tensile p.s.i. | Percent Elongation At Break | Shore D Hardness | Mooney Value, Minutes |
|---|---|---|---|---|---|---|---|
| Percent Peroxide: |     |       |       |       |     |    |    |
| 0                 | 95  | 4,500 |       | 4,500 | 30  | 70 |    |
| 2                 | 1.6 | 2,750 | 3,000 | 4,200 | 660 | 63 | 27 |

*Example 4*

The procedure of Example 2 was followed with the exceptions noted. Fifty grams of Thermax was milled into the polyethylene before the peroxide was added to it. The specimen which contained no peroxide also was compounded with 50 g. of Thermax. The molding and curing operation was conducted at 320° F. for 40 minutes rather than at 340° F. for 20 minutes. The products were tested with the following results:

*Example 7*

(a) The procedure of Example 5(a) was followed; however in this example 100 g. of Thermax was milled into the polyethylene before the peroxide was added to it. The specimen containing no peroxide also was compounded with 100 g. of Thermax. The products were tested with the following results:

|                   | Percent Compression | 10% Modulus, p.s.i. | 100% Modulus, p.s.i. | Tensile p.s.i. | Percent Elongation At Break | Shore D Hardness | Mooney Value, Minutes |
|---|---|---|---|---|---|---|---|
| Percent Peroxide: |     |       |       |       |     |    |    |
| 0                 | 75  | Too Brittle to Determine Properties | | | | | |
| 2                 | 0.0 | 3,450 |       | 3,620 | 120 | 70 | 14 |

(b) The procedure of Example 7(a) was repeated with the exception that the peroxide was replaced with 2 g. of

|                   | Percent Compression | 10% Modulus, p.s.i. | 100% Modulus, p.s.i. | Tensile p.s.i. | Percent Elongation At Break | Shore D Hardness | Mooney Value, Minutes |
|---|---|---|---|---|---|---|---|
| Percent Peroxide: |     |       |       |       |     |    |    |
| 0                 | 75  | 1,600 |       | 1,730 | 50  | 55 |    |
| 2                 | 2.0 | 1,240 | 1,600 | 2,300 | 320 | 55 | 27 |

*Example 5*

(a) In this example a polyethylene having a density of 0.96 and a number average molecular weight of 10,000 was used. One hundred grams of this polyethylene and 2 g. of 2,5-bis(tert-butylperoxy)-2,5-dimethylhexane were milled together with cutting for 3 minutes, at a temperature of 280° to 300° F. Cured test samples were molded and cured at 320° F. for 20 minutes. Test samples for the Mooney test were provided also. The products were tested with the following results:

dicumyl peroxide. A valid Mooney value could not be obtained for the reason that the sample scorched while it was being blended on the rubber mill.

*Example 8*

The procedure of Example 6 was followed, however in this case 100 g. of Thermax was milled into the polyethylene before the peroxide was added to it. The specimen containing no peroxide also was compounded

|                   | Percent Compression | 10% Modulus, p.s.i. | 100% Modulus, p.s.i. | Tensile p.s.i. | Percent Elongation At Break | Shore D Hardness | Mooney Value, Minutes |
|---|---|---|---|---|---|---|---|
| Percent Peroxide: |     |       |       |       |     |    |    |
| 0                 | 95  | 4,500 |       | 4,500 | 30  | 70 |    |
| 2                 | 0.2 | 3,000 | 3,100 | 3,200 | 650 | 60 | 18 |

| | Percent Compression | 10% Modulus, p.s.i. | 100% Modulus, p.s.i. | Tensile p.s.i. | Percent Elongation At Break | Shore D Hardness | Mooney Value, Minutes |
|---|---|---|---|---|---|---|---|
| Percent Peroxide: | | | | | | | |
| 0 | 75 | Too Brittle to Determine Properties | | | | | |
| 2 | 0.0 | 3,510 | | 3,850 | 70 | 74 | 15 |

*Example 9*

Substitution of 2,5-bis(tert-butylperoxy)-2,5-diphenylhexane, 1,1' - ethylenebis[1 - (tert - amylperoxy)cyclohexane], 3,6 - bis(tert - butylperoxy) - 3,6 - dimethyloctane, 8,11-bis(tert-butylperoxy)-8,11-dimethyloctadecane, or 2,5-bis(2,5-dimethyl-2-hexylperoxy)-2,5-dimethylhexane, in previous Examples 1 to 8 for the peroxides of this invention used in those examples, provides products having physical and chemical properties similar to those reported therein. The percent compressions of the products of this Example 9, in particular, are of the same order as those reported in the above examples; this indicates that excellent crosslinking of polyethylene is obtained with these additional peroxides.

It will be seen from the above examples that the present bis(tert-alkylperoxy)alkanes can be incorporated readily and without scorching into both high density and low density polyethylene. Likewise, despite this high resistance of the present peroxides to premature crosslinking or scorching of the polyethylene, compositions of polyethylene containing them can be cured readily at practical and useful temperatures.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Composition useful in the production of crosslinked polyethylene, consisting essentially of 100 parts by weight of polyethylene, and about 0.1 to 10 parts by weight of a bis(tert-alkylperoxy)-alkane having the formula $$R-O-O-\underset{R''}{\overset{R'}{\underset{|}{\overset{|}{C}}}}-(CH_2CH_2)_n-\underset{R''}{\overset{R'}{\underset{|}{\overset{|}{C}}}}-O-O-R$$

where $n$ is an integer from 1 to 2, R is a tertiary alkyl radical having 4 to 8 carbon atoms, and R' and R'' are hydrocarbon radicals, each having 1 to 8 carbon atoms, from the group consisting of individual hydrocarbon radicals and cycloalkylene radicals in which R' and R'' are alkylene radicals connected to form said cycloalkylene radicals.

2. Composition of claim 1 wherein the bis(tert-alkylperoxy)alkane has the following formula $$R-O-O-\underset{R''}{\overset{R'}{\underset{|}{\overset{|}{C}}}}-(CH_2CH_2)_n-\underset{R''}{\overset{R'}{\underset{|}{\overset{|}{C}}}}-O-O-R$$

where $n$ is an integer from 1 to 2, R is a tertiary alkyl radical having 4 to 8 carbon atoms, and R' and R'' are primary alkyl radicals having 1 to 8 carbon atoms.

3. Composition of claim 1, wherein about 0.5 to 3 parts by weight of the bis(tert-alkylperoxy)alkane are employed for each 100 parts by weight of polyethylene.

4. Composition useful in the production of crosslinked polyethylene, consisting essentially of 100 parts by weight of polyethylene and about 0.1 to 10 parts by weight of 2,5-bis(tert-amylperoxy)-2,5-dimethylhexane.

5. Composition useful in the production of crosslinked polyethylene, consisting essentially of 100 parts by weight of polyethylene and about 0.1 to 10 parts by weight of 2,5-bis(tert-butylperoxy)-2,5-dimethylhexane.

6. Composition useful in the production of crosslinked polyethylene consisting essentially of 100 parts by weight of polyethylene and about 0.1 to 10 parts by weight of 1,1'-ethylenebis [1-(tert-amylperoxy)cyclohexane].

7. Composition useful in the production of crosslinked polyethylene, consisting essentially of 100 parts by weight of polyethylene and about 0.1 to 10 parts by weight of 2,5-bis(tert-butylperoxy)-2,5-diphenylhexane.

8. Composition useful in the production of crosslinked polyethylene, consisting essentially of 100 parts by weight of polyethylene and about 0.1 to 10 parts by weight of 3,6-bis-(tert-butylperoxy)-3,6-dimethyloctane.

9. Method of crosslinking polyethylene, comprising mixing together 100 parts by weight of polyethylene, and about 0.1 to 10 parts by weight of a bis(tert-alkylperoxy)-alkane having the following formula $$R-O-O-\underset{R''}{\overset{R'}{\underset{|}{\overset{|}{C}}}}-(CH_2CH_2)_n-\underset{R''}{\overset{R'}{\underset{|}{\overset{|}{C}}}}-O-O-R$$

where $n$ is an integer from 1 to 2, R is a tertiary alkyl radical having 4 to 8 carbon atoms and R' and R'' are hydrocarbon radicals, each having 1 to 8 carbon atoms, from the group consisting of individual hydrocarbon radicals and cycloalkylene radicals in which R' and R'' are alkylene radicals connected to form said cycloalkylene radicals, and thereafter heating the resulting mixture to effect crosslinking of said polyethylene.

10. Method of claim 9 wherein the bis(tert-alkylperoxy)-alkane has the following formula $$R-O-O-\underset{R''}{\overset{R'}{\underset{|}{\overset{|}{C}}}}-(CH_2CH_2)_n-\underset{R''}{\overset{R'}{\underset{|}{\overset{|}{C}}}}-O-O-R$$

where $n$ is an integer from 1 to 2, R is a tertiary alkyl radical having 4 to 8 carbon atoms, and R' and R'' are primary alkyl radicals having 1 to 8 carbon atoms.

11. Method of claim 9 wherein about 0.5 to 3 parts by weight of the bis(tert-alkylperoxy)alkane are employed for each 100 parts by weight of polyethylene.

12. Method of crosslinking polyethylene, comprising mixing together 100 parts by weight of polyethylene, and about 0.1 to 10 parts by weight of 2,5-bis(tert-amylperoxy)-2,5-dimethylhexane, and thereafter heating the resulting mixture to effect crosslinking of said polyethylene.

13. Method of crosslinking polyethylene, comprising mixing together 100 parts by weight of polyethylene, and about 0.1 to 10 parts by weight of 2,5-bis(tert-butylperoxy)-2,5-dimethylhexane, and thereafter heating the resulting mixture to effect crosslinking of said polyethylene.

14. Method of crosslinking polyethylene, comprising mixing together 100 parts by weight of polyethylene, and about 0.1 to 10 parts by weight of 1,1'-ethylenebis[1-(tert-amylperoxy)-cyclohexane], and thereafter heating the resulting mixture to effect crosslinking of said polyethylene.

15. Method of crosslinking polyethylene, comprising mixing together 100 parts by weight of polyethylene, and about 0.1 to 10 parts by weight of 2,5-bis(tert-butylperoxy)-2,5-diphenylhexane, and thereafter heating the resulting mixture to effect crosslinking of said polyethylene.

16. Method of crosslinking polyethylene, comprising mixing together 100 parts by weight of polyethylene, and about 0.1 to 10 parts by weight of 3,6-bis(tert-butylperoxy)-3,6-dimethyloctane, and thereafter heating the resulting mixture to effect crosslinking of said polyethylene.

References Cited in the file of this patent

UNITED STATES PATENTS

| | | |
|---|---|---|
| 2,455,569 | Dickey | Dec. 7, 1948 |
| 2,605,291 | Barusch et al. | July 29, 1952 |
| 2,813,127 | White | Nov. 12, 1957 |
| 2,826,570 | Ivett | Mar. 11, 1958 |
| 2,888,424 | Precopio et al. | May 26, 1959 |

Notice of Adverse Decision in Interference

In Interference No. 91,111, involving Patent No. 2,916,481, E. R. Gilmont, Crosslinking of polyethylene with novel peroxides, final judgment adverse to the patentee was rendered June 5, 1962, as to claims 5 and 13.

[*Official Gazette July 10, 1962.*]